United States Patent
Cuevas Ramirez et al.

(10) Patent No.: US 11,516,710 B2
(45) Date of Patent: Nov. 29, 2022

(54) CELLULAR TELECOMMUNICATIONS NETWORK

(71) Applicant: British Telecommunications Public Limited Company, London (GB)

(72) Inventors: Maria Cuevas Ramirez, London (GB); Ruth Brown, London (GB)

(73) Assignee: British Telecommunications Public Limited Company, London (GB)

(*) Notice: Subject to any disclaimer, the term of this patent is extended or adjusted under 35 U.S.C. 154(b) by 21 days.

(21) Appl. No.: 16/487,730

(22) PCT Filed: Feb. 20, 2018

(86) PCT No.: PCT/EP2018/054135
§ 371 (c)(1),
(2) Date: Aug. 21, 2019

(87) PCT Pub. No.: WO2018/172003
PCT Pub. Date: Sep. 27, 2018

(65) Prior Publication Data
US 2020/0236595 A1     Jul. 23, 2020

(30) Foreign Application Priority Data
Mar. 24, 2017   (EP) .................................. 17162851

(51) Int. Cl.
*H04W 36/00*     (2009.01)
*H04W 8/18*      (2009.01)
(Continued)

(52) U.S. Cl.
CPC ......... *H04W 36/0027* (2013.01); *H04W 8/18* (2013.01); *H04W 36/08* (2013.01); *H04W 36/22* (2013.01); *H04W 36/38* (2013.01)

(58) Field of Classification Search
CPC ... H04W 36/0027; H04W 8/18; H04W 36/08; H04W 36/22; H04W 36/38; H04W 8/183; H04W 8/12
See application file for complete search history.

(56) References Cited

U.S. PATENT DOCUMENTS

| 8,358,624 B1 | 1/2013 | Ghaus et al. |
| 9,210,691 B2 | 12/2015 | Ponukumati et al. |

(Continued)

FOREIGN PATENT DOCUMENTS

| CN | 102387590 A | | 3/2012 |
| CN | 102387590 A | * | 3/2012 |

(Continued)

OTHER PUBLICATIONS

Chandra K., et al., "CogCell: Cognitive Interplay between 60 GHz Picocells and 2.4/5 GHz Hotspots in the 5G Era," IEEE Communications Magazine, May 7, 2015, 14 pages.

(Continued)

*Primary Examiner* — Michael K Phillips
(74) *Attorney, Agent, or Firm* — Patterson Thuente IP

(57) ABSTRACT

This disclosure invention relates to a method of operating a network node in a cellular telecommunications network, wherein the cellular telecommunications network further includes a first base station and a first User Equipment (UE), and the first UE is connected to the first base station by a first and second connection having resources associated with a first and second subscription, respectively, the method including determining that the first connection and second connection relate to the first and second subscription respectively; determining that the first connection and second connection relate to the first UE; monitoring a first resource usage of one or both of the first and second connections with the first UE; and initiating a handover of one or both of the (Continued)

first and second connections based on the first resource usage.

14 Claims, 9 Drawing Sheets

(51) Int. Cl.
*H04W 36/08* (2009.01)
*H04W 36/22* (2009.01)
*H04W 36/38* (2009.01)

(56) References Cited

U.S. PATENT DOCUMENTS

| | | |
|---|---|---|
| 9,883,436 B2 | 1/2018 | Brown |
| 10,123,241 B2 | 11/2018 | Brown |
| 2002/0187780 A1 | 12/2002 | Souissi |
| 2005/0048972 A1 | 3/2005 | Dorenbosch et al. |
| 2007/0057843 A1 | 3/2007 | Chang et al. |
| 2008/0112364 A1 | 5/2008 | Kwon et al. |
| 2008/0293394 A1 | 11/2008 | Silver et al. |
| 2010/0291924 A1 | 11/2010 | Antrim et al. |
| 2011/0217979 A1 | 9/2011 | Nas |
| 2011/0281582 A1 | 11/2011 | Jiang |
| 2012/0021744 A1 | 1/2012 | Chin et al. |
| 2012/0122515 A1 | 5/2012 | Han et al. |
| 2013/0148574 A1 | 6/2013 | Liu et al. |
| 2013/0223230 A1 | 8/2013 | Swaminathan |
| 2013/0237245 A1 | 9/2013 | Tinnakornsrisuphap et al. |
| 2013/0267229 A1 | 10/2013 | Gopalakrishnan |
| 2013/0303240 A1* | 11/2013 | Sanka .......... H04W 72/1278 455/558 |
| 2014/0066069 A1 | 3/2014 | Salami et al. |
| 2014/0114568 A1 | 4/2014 | Park |
| 2014/0187243 A1 | 7/2014 | Rune et al. |
| 2014/0233449 A1 | 8/2014 | Laroia et al. |
| 2014/0341184 A1 | 11/2014 | Dhanda et al. |
| 2014/0378129 A1 | 12/2014 | Jiang et al. |
| 2015/0038154 A1 | 2/2015 | Ponukumati et al. |
| 2015/0097731 A1 | 4/2015 | Russell |
| 2015/0126187 A1 | 5/2015 | Ponukumati et al. |
| 2015/0139015 A1 | 5/2015 | Kadous et al. |
| 2015/0296364 A1 | 10/2015 | Peruru et al. |
| 2015/0334604 A1 | 11/2015 | Banks et al. |
| 2016/0021660 A1 | 1/2016 | Krishnamurthy |
| 2016/0029281 A1 | 1/2016 | Zhou et al. |
| 2016/0095036 A1 | 3/2016 | Stojanovski et al. |
| 2016/0183281 A1 | 6/2016 | Yeh et al. |
| 2016/0205605 A1 | 7/2016 | Krishnamurthy |
| 2016/0262200 A1 | 9/2016 | Su |
| 2016/0295439 A1* | 10/2016 | Yang .......... H04W 24/10 |
| 2017/0094628 A1* | 3/2017 | Miao .......... H04W 36/08 |
| 2017/0127217 A1* | 5/2017 | Miao .......... H04W 4/60 |
| 2017/0332301 A1* | 11/2017 | Horn .......... H04W 36/18 |
| 2017/0347298 A1 | 11/2017 | Brown |
| 2018/0262922 A1 | 9/2018 | Fitch |
| 2019/0028983 A1 | 1/2019 | Mackenzie |

FOREIGN PATENT DOCUMENTS

| | | |
|---|---|---|
| CN | 103166949 A | 6/2013 |
| CN | 103460756 A | 12/2013 |
| CN | 104106274 A | 10/2014 |
| CN | 105101164 A | 11/2015 |
| CN | 105247908 A | 1/2016 |
| CN | 105340331 A | 2/2016 |
| CN | 105706501 A | 6/2016 |
| CN | 106464611 A | 2/2017 |
| CN | 106465464 A | 2/2017 |
| EP | 2434816 A2 | 3/2012 |
| EP | 2605555 A2 | 6/2013 |
| EP | 2857798 A1 | 4/2015 |
| EP | 2750444 A4 | 5/2015 |
| EP | 2991242 A1 | 3/2016 |
| GB | 2559556 A | 8/2018 |
| GB | 2559731 A | 8/2018 |
| GB | 2560754 A | 9/2018 |
| GB | 2560899 A | 10/2018 |
| JP | 2993087 B2 | 12/1999 |
| JP | 2001209891 A | 8/2001 |
| KR | 20100131025 A | 12/2010 |
| WO | WO-2009121833 A1 | 10/2009 |
| WO | WO 2010/133256 A1 | 11/2010 |
| WO | WO 2011/095687 A1 | 8/2011 |
| WO | WO 2014/021761 A2 | 2/2014 |
| WO | WO-2014130764 A1 * | 8/2014 .......... H04W 16/14 |
| WO | WO 2015/177601 A1 | 11/2015 |
| WO | WO 2015/180126 A1 | 12/2015 |
| WO | WO-2016095584 A1 | 6/2016 |
| WO | WO-2018145796 A1 | 8/2018 |
| WO | WO-2018145797 A1 | 8/2018 |
| WO | WO 2018/172002 A1 | 9/2018 |
| WO | WO 2018/172003 A1 | 9/2018 |

OTHER PUBLICATIONS

Christodoulou C. G., et al., "Reconfigurable Antennas for Wireless and Space Applications," Proceedings of the IEEE, Jul. 2012, vol. 100, No. 7, pp. 2250-2261.
Combined Search and Examination Report under Section 17 and 18(3) for Application No. 1702030.6, dated Jul. 7, 2017, 2 pages.
Corrected Search Report under Section 17 for Great Britain Application No. GB1702033.0, dated Jun. 29, 2017, 2 pages.
Examination Report under section 18(3) for Application No. 1702030. 6, dated May 3, 2019, 2 pages.
Examination Report under Section 18(3) for Great Britain Application No. 1704702.8, dated Oct. 22, 2019, 4 pages. .
Extended European Search Report for Application No. 17155116.1, dated Jul. 6, 2017, 8 pages.
Extended European Search Report for Application No. 17155118.7, dated Aug. 29, 2017, 7 pages.
Great Britain Combined Search and Examination Report under Sections 17 & 18 (3) for Application No. GB1702033.0, dated Nov. 29, 2017, 1 page.
International Preliminary Report on Patentability for Application No. PCT/EP2017/082585, dated Aug. 22, 2019, 10 pages.
International Preliminary Report on Patentability for Application No. PCT/EP2017/082586, dated Aug. 22, 2019, 7 pages.
International Preliminary Report on Patentability for Application No. PCT/EP2018/054134, dated Oct. 3, 2019, 20 pages.
International Search Report and Written Opinion for Application No. PCT/EP2017/082585, dated Apr. 9, 2018, 11 pages.
International Search Report and Written Opinion for Application No. PCT/EP2017/082586, dated Feb. 9, 2018, 9 pages.
International Search Report and Written Opinion for Application No. PCT/EP2018/054135, dated Apr. 26, 2018, 12 pages.
Search Report under Section 17 for Great Britain Application No. GB1702033.0, dated Jun. 29, 2017, 1 page.
Search Report under Section 17 for Great Britain Application No. 1702030.6, dated Jul. 6, 2017, 1 page.
Tunon D., et al., "Adding Dimensions to Wireless Systems with Orientation-Aware Devices and Reconfigurable Antennas," International Conference on Computing, Networking and Communications, Invited Position Papers, 2014, pp. 298-302.
Yang Z., et al., "Sensor-assisted Codebook-based Beamforming for Mobility Management in 60 GHz WLANs," IEEE 12th International Conference on Mobile Ad Hoc and Sensor Systems, 2015, pp. 333-341.
Application and File History for U.S. Appl. No. 16/487,744, filed Aug. 21, 2019, Inventor: Ramirez.
Application and Filing Receipt for U.S. Appl. No. 16/484,659, filed Aug. 8, 2019, Inventor: Mehran.
Application and Filing Receipt for U.S. Appl. No. 16/484,740, filed Aug. 8, 2019, Inventor: Mehran.
Extended European Search Report for Application No. 17162851.4, dated Sep. 5, 2017 (13 pgs).
Great Britain Combined Search and Examination Report Under Sections 17 & 18(3) for GB 1704694.7, dated Aug. 14, 2017 (2 pgs).

(56) References Cited

OTHER PUBLICATIONS

Great Britain Search Report Under Section 17 for Application No. GB1704694.7, dated Aug. 11, 2017 (2 pgs).
Great Britain Examination Report under Section 18(3) for Application No. GB 1704694.7, dated Jun. 5, 2019 (1 pg).
International Search Report and Written Opinion for Application No. PCT/EP2018/054135, dated Apr. 26, 2018 (12 pgs).
Legg et al., "Load Balancing and Aggregation Algorithms for LTE dual connectivity," *2016 IEEE 83rd Vehicular Technology Conference (VTC Spring)*, IEEE, May 15, 2016 (5 pgs).
Viprinet: Bonding LTE / 4 G via LTE routers—better than Load Balancing | LTE /4G (Jul. 1, 2019) Accessed at [https://www.viprinet.com/en/technology/combinable-media/lte-4g] (4 pgs).
3GPP TS 23.122, Generation Partnership Project; Technical Specification Group Core Network and Terminals; Non-Access-Stratum (NAS) functions related to Mobile Station (MS) in idle mode, 3rd Generation Partnership Project (3GPP), Mobile Competence Centre; 650, Route Des Lucioles; F-06921 Sophia-Antipolis Cedex; France, vol. CT WG1, No. V12.9.0, Jun. 24, 2016, XP051295206, (Release 12), 1 page.
3rd Generation Partnership Project; Technical Specification Group Radio Access Network; Evolved Universal terrestrial Radio Access (E-UTRA) and Evolved Universal Terrestrial Radio Access Network (E-UTRAN); Radio interface protocol aspects (Release 7), Oct. 17, 2006, XP050909974, 1 page.
Combined Search and Examination Report under Sections 17 & 18(3) for Great Britain Application No. 1704702.8, dated Aug. 14, 2017, 2 pages.
Examination Report Under Section 18(3) for Great Britain Application No. GB1704702.8, dated Jun. 17, 2019, 2 pages.
Extended European Search Report for Application No. 17162854.8, dated Aug. 31, 2017, 18 pages.
International Preliminary Report on Patentability for Application No. PCT/EP2018/054135, dated Oct. 3, 2019, 11 pages.
International Search Report and Written Opinion for Application No. PCT/EP2018/054134, dated Apr. 5, 2018, 23 pages.
Search Report Under Section 17 for Great Britain Application No. GB1704702.8, dated Aug. 10, 2017, 2 pages.
Lesslie R G., et al., "The Application of a Simple Spatial Multi-Criteria Analysis Shell to Natural Resource Management Decision Making," ResearchGate, Jan. 2008, 26 pages.
Office Action For Chinese Application No. 201880011588.7, dated Aug. 2, 2021, 21 pages.
Office Action For Chinese Application No. 201880019173.4, dated Sep. 1, 2021, 9 pages.

\* cited by examiner

CELLULAR TELECOMMUNICATIONS NETWORK

CROSS-REFERENCE TO RELATED APPLICATION

The present application is a National Phase entry of PCT Application No. PCT/EP2018/054135, filed Feb. 20, 2018, which claims priority from European Patent Application No. 17162851.4 filed Mar. 24, 2017, each of which is fully incorporated herein by reference.

TECHNICAL FIELD

The present disclosure relates to a cellular telecommunications network and a method of operating the same.

BACKGROUND

Cellular telecommunications networks typically comprise a plurality of base stations which each serve a plurality of User Equipment (UE). The plurality of base stations each have a coverage area (usually called a "cell"), within which a UE may connect to and receive telephony and data services from the base station. Cellular networking protocols also have defined processes for allowing a UE to disconnect from one base station and connect to another base station with minimal disruption to ongoing services. This is typically known as a handover.

There are several identifiers associated with UEs, such as the International Mobile Equipment Identifier (IMEI) and the International Mobile Subscriber Identifier (IMSI). The IMEI is a unique number used to identify the UE device and is typically stored within a non-removable memory module of the UE. The IMSI is a unique number used to identify the subscriber (i.e. the user), and is typically stored on a memory module of an integrated circuit card (such as a Subscriber Identity Module (SIM) card). In practice, a user subscribes to telephony and/or data services from a Mobile Network Operator (MNO) and this subscription is associated with an IMSI and a SIM card. The user may then receive these subscribed-for services through a UE by associating it with the IMSI (usually by connecting the SIM card to a SIM-card interface on the UE).

The concept of a multi-subscriber-UE has been introduced to provide improved services for consumers with high cellular networking demands. A multi-subscriber-UE is a single device that may be associated with a plurality of different subscriptions for cellular networking services. The multi-subscriber-UE may set up a connection to a base station for each subscription, and thereafter utilize all resources of these subscriptions through a single device. In other words, the multi-subscriber-UE may establish a first bearer for a first subscription, and a second bearer for a second subscription, and combine the resources of both the first and second bearers. Any application running on the multi-subscriber-UE may then use these combined resources via both the first and second bearers as if they are a single resource, such that the maximum data rate for that application is the sum of the data rate of the first bearer and the data rate of the second bearer. In this manner, the multi-subscriber-UE may realize much greater data rates than it would have access to if it were only associated with a single subscription.

The high-data rates of multi-subscriber-UEs can cause problems in the cellular telecommunications network. As several of the subscription-independent-bearers of the multi-subscriber-UE may be served by a single base station, and the data transmissions via these bearers occur contemporaneously as a combined resource, then the instantaneous demand on the serving base station can be significant. It is therefore more likely for a base station to become overloaded when serving such multi-subscriber-UEs when compared to serving a plurality of single-subscription UEs (which are less likely to utilize their resources at the same time).

It is therefore desirable to alleviate some or all of the above problems.

SUMMARY

According to a first aspect of the disclosure, there is provided a method of operating a network node in a cellular telecommunications network, wherein the cellular telecommunications network further includes a first base station and a first User Equipment (UE) and the first UE is connected to the first base station by a first and second connection having resources associated with a first and second subscription respectively, the method comprising: determining that the first connection and second connection relate to the first and second subscription respectively; determining that the first connection and second connection relate to the first UE; monitoring a first resource usage of one or both of the first and second connections with the first UE; and initiating a handover of one or both of the first and second connections based on the first resource usage.

According to a second aspect of the disclosure, there is provided a device for a cellular telecommunications network, wherein the cellular telecommunications network further includes a first base station and first User Equipment (UE) wherein the first UE is connected to the first base station by a first and second connection having resources associated with a first and second subscription respectively, the device comprising: a processor adapted to: determine that the first connection and second connection relate to the first and second subscription respectively, determine that the first connection and second connection relate to the first UE; monitor a first resource usage of one or both of the first and second connections; and initiate a handover of one or both of the first and second connections based on the first resource usage. The device may be a base station.

Embodiments of the present disclosure therefore provide a technique to recognize when a resource usage of a plurality of subscription-independent connections between a multi-subscriber-UE and a base station satisfy a criterion for triggering a handover. In this manner, one or more of the plurality of subscription-independent connections may be subject to a handover to one or more other base stations, such that the impact of any contemporaneous sessions over these connections is mitigated.

The first resource usage may be the cumulative resource usage of the first and second connection between the first UE and the network node. In this manner, the effects of both connections may be taken into account when determining whether to hand over one or more of the connections to one or more other base stations.

Initiating the handover may be of both the first and second connections to a second base station, or may be of one of the first or second connections to a second base station, or may be of the first connection to a second base station and of the second connection to a third base station.

The method may further comprise (and the processor may be further adapted for) defining a connection group including the first and second connection, wherein the step of determining the first resource usage is of the connection group. Therefore, when such a connection group is identified, the first resource usage relating to the connection group may be monitored. The connection group may further include a third connection, the third connection relating to the first subscription and to the first UE. Accordingly, if the multi-subscriber-UE sets up several connections (the first and third) for the first subscription, and a second connection for the second subscription, then the resource usage of all these connections may be monitored and may all be part of any initiated handover.

The handover may indicate to the second base station that the first and second connections are associated with the UE. Embodiments of the disclosure provide a technique for a serving base station to indicate to a target base station (e.g. during the handover initiation process) that the plurality of connections relate to the same UE. Advantageously, this allows the target base station to skip any steps of recognizing that the plurality of connections relate to the same UE. The target base station may therefore immediately start monitoring a resource usage of the first and/or second connection, and initiate a handover if it satisfies a threshold.

The cellular telecommunications network may further include a second UE, and the second UE may be connected to the network node by a third and fourth connection having resources associated with a third and fourth subscription respectively, and the method may further comprise the steps of: monitoring a second resource usage of one or both of the third and fourth connections with the second UE; and initiating the handover of one or both of the first and second connections based on one or both of the first and second resource usage. Thus, if a base station serves several multi-subscriber-UEs, then a handover of one or both connections associated with one multi-subscriber-UE may be based on the resource usage of connections associated with several multi-sub scriber-UEs.

The cellular telecommunications network may further include a management node having a database indicating a partnership between a first and second network, and the method may further comprise detecting that one or both of the first and second connections relates to the first network; sending a message to the management node, the message identifying the first network; receiving a response message from the management node, the response message identifying the second network, wherein initiating the handover of one or both of the first and second connections is to the second network. Thus, if it is decided that one or both connections should be subject to a handover, then it may advantageously be made to a base station of a preferred roaming partner network (such that the multi-subscriber-UE is likely to receive preferential Quality of Service and billing rates).

According to a third aspect of the disclosure, there is provided a computer program comprising instructions which, when the program is executed by a computer, cause the computer to carry out the method of the first aspect of the disclosure. The computer program may be stored on a computer-readable data carrier.

BRIEF DESCRIPTION OF THE DRAWINGS

In order that the present disclosure may be better understood, embodiments thereof will now be described, by way of example only, with reference to the accompanying drawings in which.

DETAILED DESCRIPTION

Figure 1:
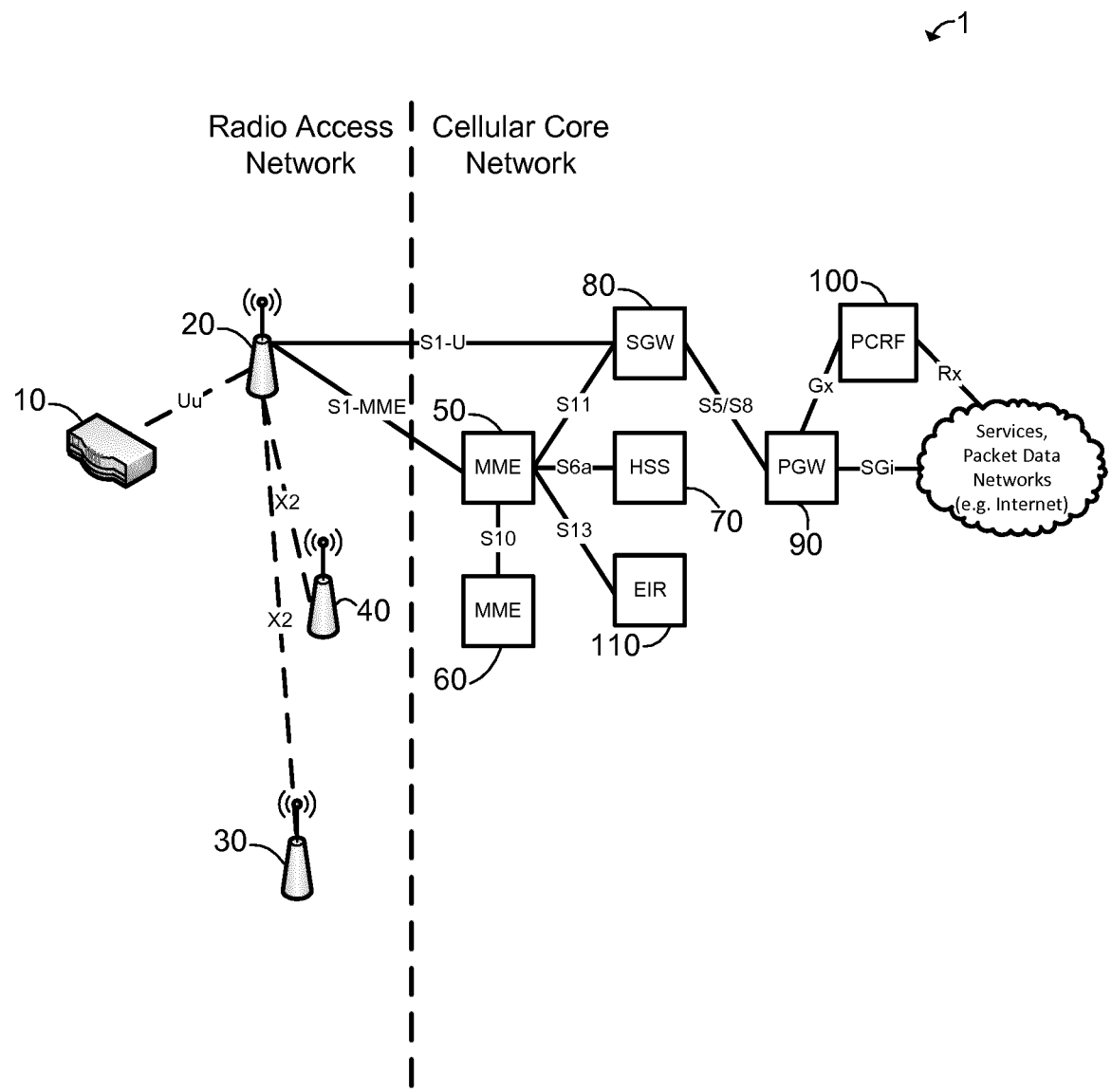
FIG. 1 is a schematic diagram of a cellular telecommunications network of a first embodiment of the present disclosure.

A first embodiment of a cellular telecommunications network 1 will now be described with FIGS. 1 to 4. The cellular network 1 includes a plurality of radio access networking components, such as a multi-subscriber-User Equipment (UE) 10 and a first, second and third base station 20, 30, 40, and a plurality of core networking components, such as a first and second Mobility Management Entity (MME) 50, 60, a Home Subscriber Service (HSS) 70, a Serving Gateway (SGW) 80, a Packet Data Network Gateway (PGW) 90, a Policy Control and Charging Rules Function (PCRF) 100, and an Equipment Identity Register (EIR) 110. In this embodiment, the connections between the entities of the radio access networking components (i.e. between the UE and the first, second and third base stations) are over a wireless communications interface using a cellular networking protocol (such as the $3^{rd}$ Generation Partnership, 3GPP, Long Term Evolution, LTE, protocol) and the connections between the core networking components are over a wired communications interface (such as an optical fiber connection). FIG. 1 identifies the names for the various connections as used in the LTE protocol (e.g. the S1-MME connection between the base station and the MME). FIG. 1 also illustrates an onward connection from the core network to other cellular networking services and packet data networks, such as the Internet.

Figure 2:
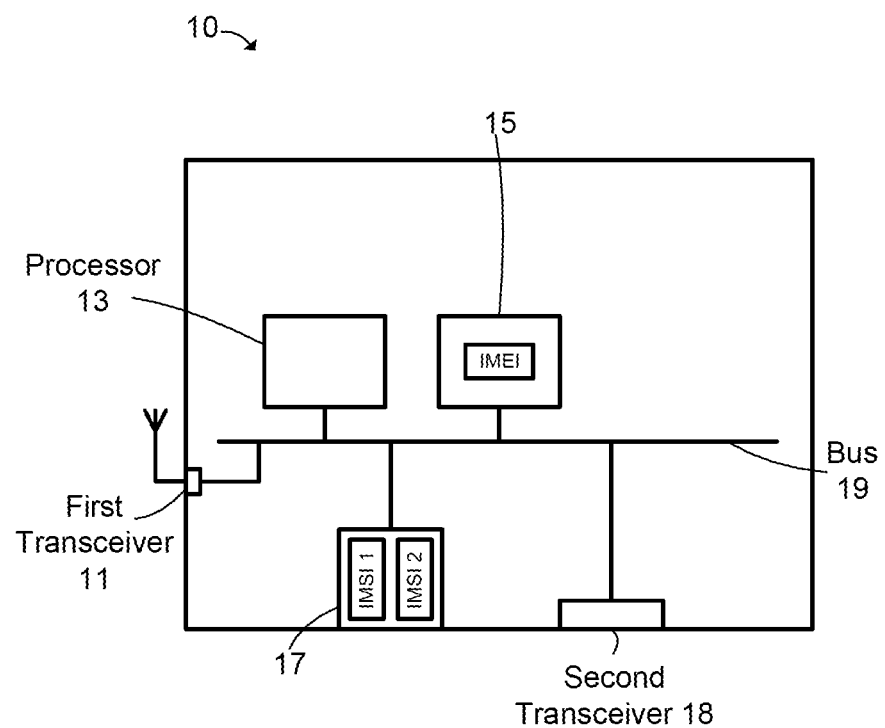
FIG. 2 is a schematic diagram of a User Equipment of the network of FIG. 1.

FIG. 2 is a schematic diagram of the multi-subscriber-UE 10, illustrating a first transceiver 11, a processor 13, memory 15, a multi-SIM Card interface 17, and a second transceiver 18, all connected via bus 19. In this embodiment, the first transceiver 11 is an antenna adapted for cellular communications using the LTE protocol and the second transceiver 18 is a Local Area Network (LAN) communications interface adapted for wireless and/or wired connections to other devices (such as any one of the 802.11 family of wireless communication interfaces and/or an Ethernet communications interface). The multi-subscriber-UE 10 therefore acts as a router for routing data packets between devices connected via the second transceiver 18, and interconnects any such connected device to the cellular network via the first transceiver 11. Memory 15 stores the International Mobile Equipment Identify (IMEI) number, which is unique for the multi-subscriber-UE 10 (which, in this example, shall be 'IMEI 1'). The multi-subscriber-UE 10 also includes a SIM card interface which, in this embodiment, may receive a first SIM card associated with a first subscription for a cellular networking service and a second SIM card associated with a second subscription for a cellular networking service. In this embodiment, the first and second SIM card (also shown in FIG. 2) also include a memory module for storing a unique International Mobile Subscriber Identity (IMSI) number thereon (which, in this example, shall be 'IMSI 1' and 'IMSI 2' respectively).

Figure 3:
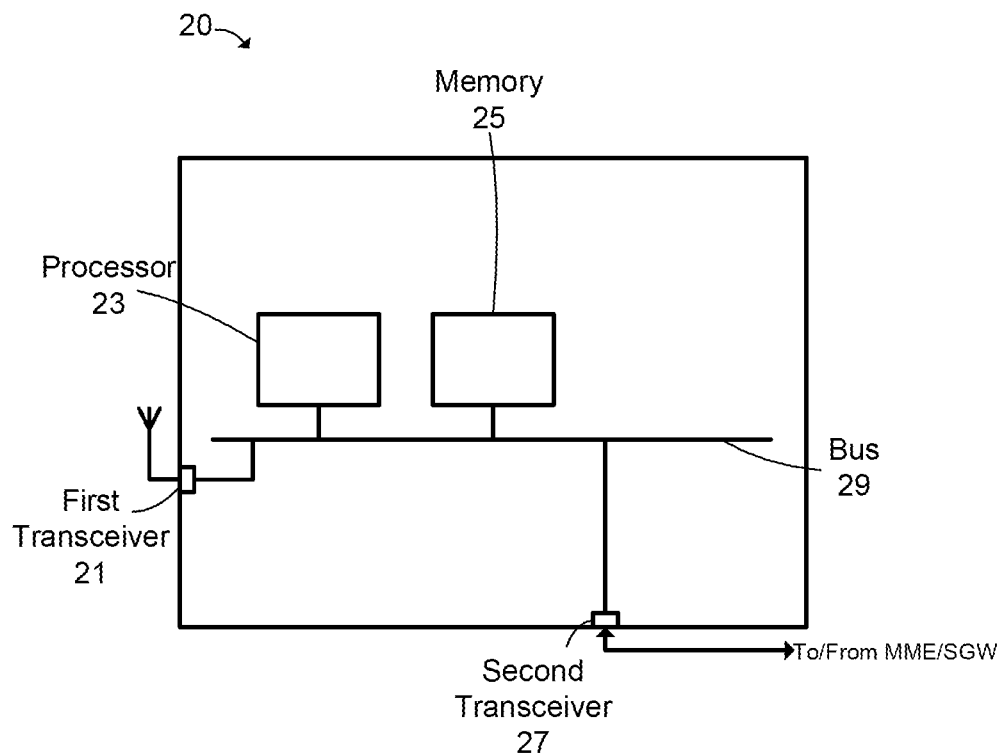
FIG. 3 is a schematic diagram of a base station of the network of FIG. 1.

FIG. 3 is a schematic diagram of the first base station 20. The first base station 20 includes a first transceiver 21, a processor 23, memory 25 and a second transceiver 27, all connected via bus 29. The first transceiver 21 is an antenna adapted for cellular communications using the LTE protocol and the second transceiver is an optical fiber connection to the core cellular networking entities (that is, the MME and the SGW). In this embodiment, memory 15 includes a first database having an entry for each bearer that is part of a bearer group, and a second database having an entry for each bearer group and its corresponding handover threshold. The purpose of these databases and the concept of the bearer group will become clear upon review of the description of the embodiments of the method of the present disclosure.

The second and third base stations 30, 40 are substantially the same as the first base station, and thus have corresponding first and second transceivers, processors and memories.

Figure 4:
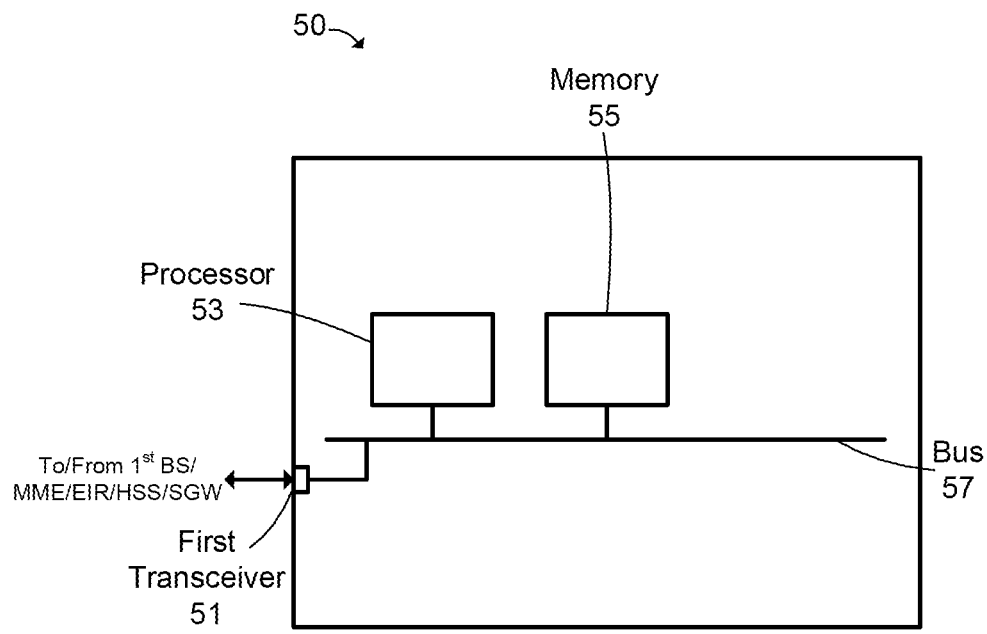
FIG. 4 is a schematic diagram of a Mobility Management Entity of the network of FIG. 1.

FIG. 4 is a schematic diagram of the first MME 50, which includes a first transceiver 51, a processor 53 and memory 55, all connected via bus 57. The first transceiver 51 is an optical fiber connection to the first base station 20 and to cellular core networking components (such as other MMES, the EIR, the HSS and the SGW). In this embodiment, memory 55 includes a first database having an entry for each bearer for the first base station, together with that bearer's associated IMSI and IMEI, and a second database having entries for a plurality of Network Operators and one or more associated preferred roaming partner networks. Again, the purpose of these databases will become clear upon review of the description of the embodiments of the method of the present disclosure.

Figure 5:
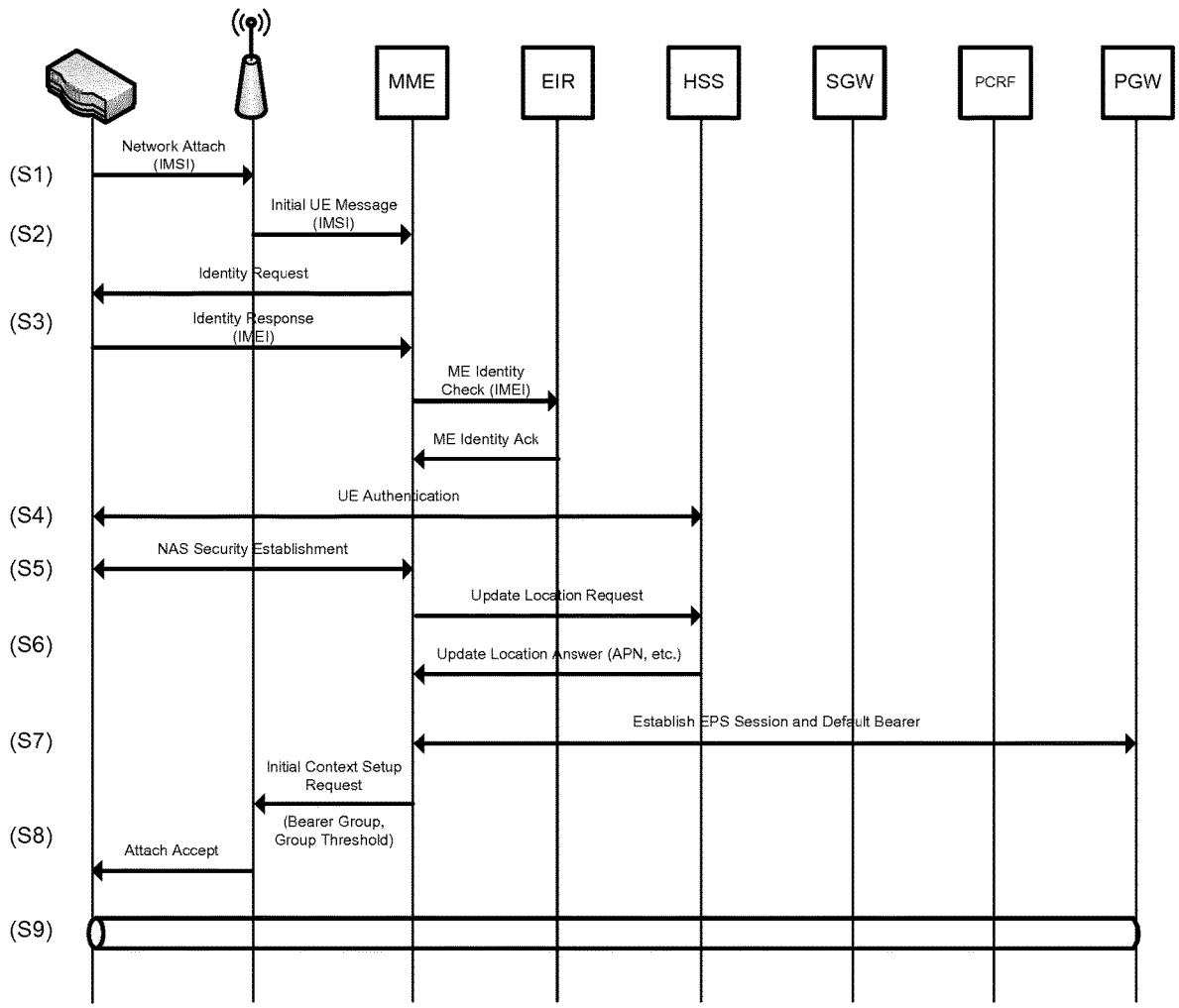
FIG. 5 is a call flow diagram illustrating a first embodiment of a method of the present disclosure.

A first embodiment of a method of the present disclosure will now be described with reference to the call flow diagram of FIG. 5. In this embodiment, the multi-subscriber-UE 10 is configured to perform a Network Attach procedure for the first IMSI (i.e. for the first SIM card and its associated first subscription for a cellular networking service), followed by a Network Attach procedure for the second IMSI (i.e. for the second SIM card and its associated second subscription for a cellular networking service).

In S1, the multi-subscriber-UE 10 selects the first base station 20 following a cell selection procedure and establishes a Radio Resource Control (RRC) connection therewith. As part of the RRC connection setup process, the multi-subscriber-UE 10 sends an 'Attach Request' message to the first base station 20, which includes the IMSI of the first SIM card. In step S2, the first base station 20 allocates an 'eNB UE S1AP ID' to the UE, and sends an 'Initial UE Message' to the MME 50, which has the 'Attach Request' message (and thus the IMSI of the first SIM card) embedded within.

As noted above, the MME 50 includes a first database having an entry for each bearer for the first base station, together with that bearer's associated IMSI and IMEI. At this stage of the process, a new entry on the first database may be part-populated with the following information:

TABLE 1

Table illustrating the information contained in the first MME 50 database following S2

| Serving BS | EPS Bearer ID | Associated IMSI | Associated IMEI | PDN |
|---|---|---|---|---|
| 1<sup>st</sup> BS | 5 | IMSI 1 | N/A | N/A |

In S3, the MME 50 retrieves the IMEI from the multi-subscriber-UE 10 using 'Identity Request' and 'Identity Response' messages. The MME 50 then sends the retrieved IMEI to the EIR 110 in an 'ME Identity Check Request' message for authentication. Once authenticated, the EIR 110 responds with a 'ME Identity Check Ack' message. In this embodiment, the MME 50 then updates its first database, thus:

TABLE 2

Table illustrating the information contained in the first MME 50 database following S3

| Serving BS | EPS Bearer ID | Associated IMSI | Associated IMEI | PDN |
|---|---|---|---|---|
| 1<sup>st</sup> BS | 5 | IMSI 1 | IMEI 1 | N/A |

In S4, the multi-subscriber-UE 10, MME 50 and the HSS 70 cooperate to authenticate the multi-subscriber-UE 10 on the network. In S5, the multi-subscriber-UE 10 and MME 50 cooperate to establish Non-Access Stratum (NAS) security so that NAS messages can be securely exchanged between them.

In S6, the MME 50 sends an 'Update Location Request' message to the HSS 70 to register IMSI 1 with the HSS 70 and to discover what services IMSI 1 is subscribed to. In response, the HSS 70 registers IMSI 1 and responds with an 'Update Location Answer' message identifying the subscribed-to services (such as the Access Point Name (APN), PGW, Quality of Service (QoS) profile, etc. that the IMSI 1 may use). In this embodiment, the first MME 50 then updates its first database, thus:

TABLE 3

Table illustrating the information contained in the first MME 50 database following S6

| Serving BS | EPS Bearer ID | Associated IMSI | Associated IMEI | PDN |
|---|---|---|---|---|
| 1<sup>st</sup> BS | 5 | IMSI 1 | IMEI 1 | APN 1 |

In S7, the first MME 50 cooperates with the SGW 80, the PGW 90, and the PCRF 100 to establish an Evolved Packet System (EPS) session and a default bearer for IMSI 1, in which the default bearer is allocated the appropriate network and radio resources for providing the services identified by the HSS 70.

In S8, the first MME 50 determines whether there are any other bearers in its database which have a common IMEI, but a different IMSI. As the table only includes a single entry at this stage, this determination is negative. Accordingly, the first MME 50 sends an 'Initial Context Setup Request' message to the first base station 20, which includes an EPS Radio Access Bearer (RAB) ID (which is equivalent to EPS Bearer 5 stored in the first MME 50 for the default bearer) together with information regarding its QoS. The 'Initial Context Setup Request' message also includes an 'Attach Accept' message to be delivered by the first base station 20 to the multi-subscriber-UE 10, which is responsive to the 'Attach Request' message (from S1) and includes the IP address.

In this embodiment, the 'Initial Context Setup Request' message from the first MME 50 to the first base station 20 also indicates whether the default bearer is part of a bearer group and the associated bearer group's threshold. However, as the determination at S8 was negative, this message indicates that the default bearer is not part of a bearer group. The purpose of this modification to the 'Initial Context Setup Request' message will become clear upon review of corresponding description relating to the Network Attach procedure for IMSI 2. On receipt of this message, the first base station 20 populates its first database with a new entry for the EPS RAB:

TABLE 4

Table illustrating the information contained in the first base station's 10 first database following S8

| EPS RAB ID | Associated IMSI | Associated IMEI | Bearer Group |
|---|---|---|---|
| EPS RAB 5 | IMSI 1 | IMEI 1 | N/A |

In S9, the default bearer from the multi-subscriber-UE 10 to the PGW 90 for IMSI 1 is complete, allowing both downlink and uplink communication with the PGW 90.

Now a default bearer for IMSI 1 has been established, the multi-subscriber-UE 10 then performs the Network Attach procedure for the second IMSI. As the process is substantially the same (and any differences will be highlighted in the following description), the same reference numerals of FIG. 5 will be used.

In S1, the multi-subscriber-UE 10 also selects the first base station 20 following a cell selection procedure and establishes a Radio Resource Control (RRC) connection therewith. As part of the RRC connection setup process, the multi-subscriber-UE 10 sends an 'Attach Request' message to the first base station 20, which includes the IMSI of the second SIM card (i.e. IMSI 2). In S2, the first base station 20 allocates an 'eNB UE S1AP ID' to the UE, and sends an 'Initial UE Message' to the MME 50, which has the 'Attach Request' message (and thus the IMSI of the second SIM card, IMSI 2) embedded within. On receipt of this message, the MME 50 updates its first database thus:

TABLE 5

Table illustrating the information contained in the first MME 50 database following S2 for the second IMSI

| Serving BS | EPS Bearer ID | Associated IMSI | Associated IMEI | PDN |
|---|---|---|---|---|
| 1$^{st}$ BS | 5 | IMSI 1 | IMEI 1 | APN 1 |
| 1$^{st}$ BS | 6 | IMSI 2 | N/A | N/A |

In S3, the first MME 50 retrieves the IMEI from the multi-subscriber-UE 10 using 'Identity Request' and 'Identity Response' messages and authenticates the IMEI with the EIR 110. Following this step, the first MME 50 updates its first database thus:

TABLE 6

Table illustrating the information contained in the first MME 50 database following S3 for the second IMSI

| Serving BS | EPS Bearer ID | Associated IMSI | Associated IMEI | PDN |
|---|---|---|---|---|
| 1$^{st}$ BS | 5 | IMSI 1 | IMEI 1 | APN 1 |
| 1$^{st}$ BS | 6 | IMSI 2 | IMEI 1 | N/A |

In S4 and S5, the multi-subscriber-UE 10 is authenticated on the network and NAS security is established. In S6, the first MME 50 sends an 'Update Location Request' message to the HSS 70 to register IMSI 2 with the HSS 70 and to discover what services IMSI 2 is subscribed to. In response, the HSS 70 registers IMSI 2 and responds with an 'Update Location Answer' message identifying the subscribed-to services (such as the Access Point Name (APN), PGW, Quality of Service (QoS) profile, etc. that the IMSI 2 may use). In this embodiment, the MME 50 then updates its first database, thus:

TABLE 7

Table illustrating the information contained in the first MME 50 database following S6 for the second IMSI

| Serving BS | EPS Bearer ID | Associated IMSI | Associated IMEI | PDN |
|---|---|---|---|---|
| 1$^{st}$ BS | 5 | IMSI 1 | IMEI 1 | APN 1 |
| 1$^{st}$ BS | 6 | IMSI 2 | IMEI 1 | APN 1 |

In S7, the first MME 50 establishes an Evolved Packet System (EPS) session and a default bearer for IMSI 2, in which the default bearer is allocated the appropriate network and radio resources for providing the services identified by the HSS 70.

In S8, the first MME 50 determines whether there are any other bearers in its database which have a common IMEI, but a different IMSI. As shown in Table 7, EPS Bearer IDs 5 and 6 have the same IMEI, but different IMSIs. This indicates that the bearers terminate in a common terminal (i.e. the multi-subscriber-UE 10) and can therefore be allocated to a bearer group. In this example, EPS Bearer IDs 5 and 6 are allocated to Bearer Group 1. Accordingly, the first MME 50 sends an 'Initial Context Setup Request' message to the first base station 20, which includes an EPS Radio Access Bearer (RAB) ID (which is equivalent to EPS Bearer 6 stored in the first MME 50 for the default bearer) together with information regarding its QoS, together with a distinct IP address. This message also indicates that both EPS Bearer IDs 5 and 6 are part of Bearer Group 1, and Bearer Group 1 has corresponding threshold, $D1_{max}$. In this embodiment, the threshold is the cumulative data rate of the bearer group.

On receipt of the 'Initial Context Setup Request' message, the first base station 20 updates its first database thus:

TABLE 8

Table illustrating the information contained in the first base station's 10 first database following S8 for the second IMSI

| EPS RAB ID | Associated IMSI | Associated IMEI | Bearer Group |
|---|---|---|---|
| EPS RAB 5 | IMSI 1 | IMEI 1 | Bearer Group 1 |
| EPS RAB 6 | IMSI 2 | IMEI 1 | Bearer Group 1 |

The first base station 20 also creates a new entry in its second database:

TABLE 9

Table illustrating the information contained in the first base station's 10 second database following S8 for the second IMSI

| Bearer Group | Group Threshold |
|---|---|
| Bearer Group 1 | $D1_{max}$ |

In S9, the default bearer from the multi-subscriber-UE 10 to the PGW 90 for IMSI 2 is complete, allowing both downlink and uplink communication with the PGW 90.

Following completion of the above process, the multi-subscriber-UE 10 has established default bearers for both the first and second IMSI, such that the resources of both bearers can be combined. This is achieved by the first base station 10 establishing a single logical interface for each bearer, based on their respective IP addresses. In this manner, any application running on the multi-subscriber-UE 10 (or any device connected thereto) may realize data rates which are the sum of the data rate permitted under the first subscription (associated with IMSI 1) and the data rate permitted under the second subscription (associated with IMSI 2).

Figure 6:
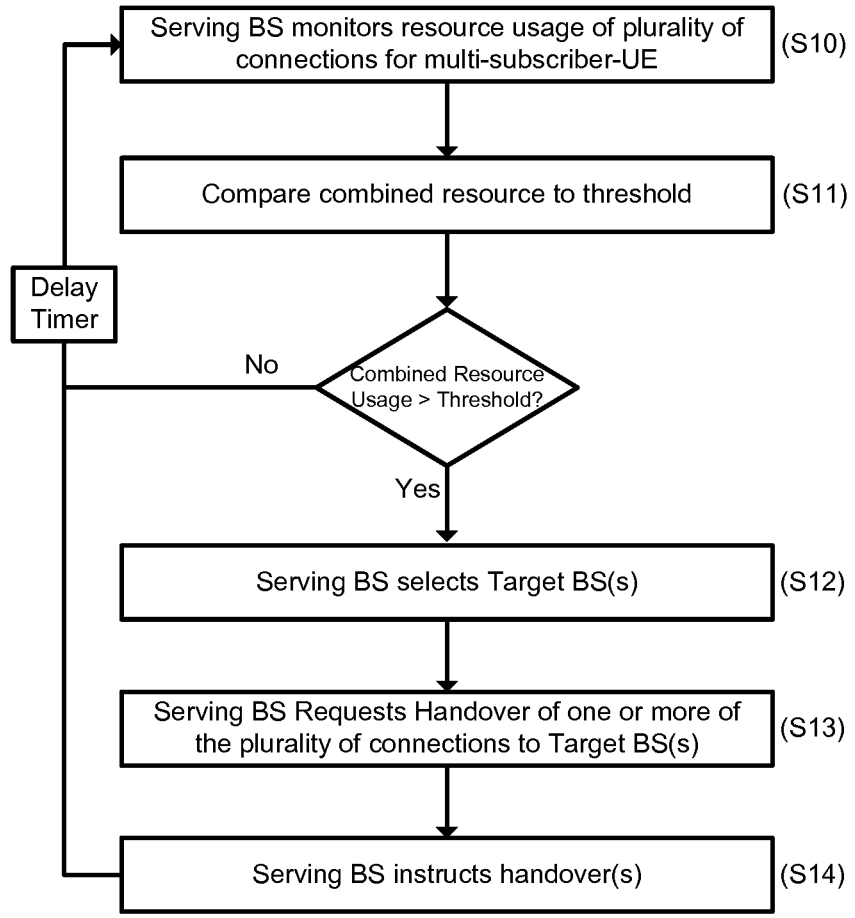
FIG. 6 is a flow diagram further illustrating the method of FIG. 5.

Now these default bearers have been established and the databases of the first base station 20 and first MME 50 have been populated, then this embodiment of the disclosure continues with the following iterative process (as outlined in FIG. 6).

In S10, the first base station 20 monitors the default bearers of Bearer Group 1 to determine their respective data rates. These data rates are then summed to determine the cumulative data rate for Bearer Group 1. In S11, this cumulative data rate is compared to the bearer group threshold, $D1_{max}$. If the cumulative data rate is less than the threshold, then the process loops back to S10 (via a delay timer).

In this example, the cumulative data rate is greater than the threshold and the process moves to S12, in which the first base station 20 selects one or more other base stations (e.g. the second and/or third base stations 30, 40) as the target(s) of a handover of the bearers associated with the first and second IMSIs. This selection may be based on one or more of the reported Reference Signal Received Power (RSRP) between the multi-subscriber-UE 10 and the second and third base stations 30, 40, and the load of the second and third base stations 30, 40 (which may be obtained over the respective X2 interfaces). In this example, the first base station 20 determines that both default bearers associated with the first and second IMSIs should handover to the second base station 30. Accordingly, in S13, the first base station 20 sends a message to the second base station 30 requesting a handover of the default bearers of both the first and second IMSIs, and receives a positive response. In S14, the first base station 20 instructs the multi-subscriber-UE 10 to handover both default bearers associated with the first and second IMSI to the second base station 30.

In this embodiment, the handover instruction messages identify that the first and second default bearers relate to a bearer group, and further identify the group threshold for that bearer group. Accordingly, the second base station 30 may recognize that these connections relate to the same UE and may immediately perform the monitoring of S10 to S14 (that is, without having to recognize these associations using S1 to S9). The second base station 30 may also update the bearer group threshold such that it is appropriate for its configuration and environment.

Once the handover is complete, the first base station 10 deletes the entries in its first and second databases relating to these default bearers, and the process then loops back to S10 (via the delay timer) for a subsequent iteration. Accordingly, if any further bearers are established on the first base station 20 for a multi-subscriber-UE, then these are monitored and a handover may be triggered if the appropriate threshold is satisfied.

In the above embodiment, the first base station 20 determines that all bearers associated with the multi-subscriber-UE 10 should hand over to the second base station 30. However, this is non-essential. In other implementations, a subset of the default bearers for the multi-subscriber-UE 10 may continue to be served by the first base station 20, whilst the remainder are subject of a handover. Furthermore, a handover of a plurality of default bearers may be to a plurality of other base stations.

The skilled person will also understand that it is non-essential for there to be only the default bearer for each IMSI. For example, further (i.e. dedicated) bearers may be established for the same IMSI but to an alternative PDN. In such a scenario, the MME 50 may store a database entry for each bearer identifying the IMSI, the IMEI and the PDN. However, as noted above in S8 of the above embodiment, the MME 50 determines that a bearer group exists if there are two bearers having the same IMEI but different IMSIs (regardless of their PDNs). In other words, the MME 50 does not determine that a bearer group exists if there are two bearers having the same IMEI and the same IMSI (but with different PDNs). However, it is advantageous for the MME 50 to record such dedicated bearers as the MME 50 may also associate them with a bearer group once it has been identified. For example, the first database of MME 50 may identify the following bearers:

TABLE 10

Table illustrating the MME 50 first database with both default and dedicated bearers

| Serving BS | EPS Bearer ID | Associated IMSI | Associated IMEI | PDN |
|---|---|---|---|---|
| 1$^{st}$ BS | 5 | IMSI 1 | IMEI 1 | APN 1 |
| 1$^{st}$ BS | 6 | IMSI 2 | IMEI 1 | APN 1 |
| 1$^{st}$ BS | 7 | IMSI 2 | IMEI 1 | APN 2 |

In this scenario, the MME 50 would determine that a bearer group exists as EPS Bearer ID 5 and EPS Bearer IDs 6 or 7 are for the same IMEI but for different IMSIs. Thus, Bearer Group 1 may be created, which may include both EPS Bearer IDs 5 and 6. Further, as EPS Bearer ID 7 relates to the same IMEI, it may also be added to Bearer Group 1. This bearer may then be monitored and be part of the handover processing (of S10 to S14).

Furthermore, the skilled person will also understand that the decision to handover one or more of the bearers may be based on other factors than the cumulative data rate of all bearers. For example, it may be based on some other resource usage factor, such as the data rate of one or a subset of the bearers, an average data rate of all bearers, a usage percentage of the overall base station capacity, and/or the type of service being used by a bearer (e.g. if the bearer relates to a VoIP service).

The skilled person will also understand that base stations serve many UEs, and several of those UEs may be multisubscriber-UEs. In a further example, therefore, the first base station may also serve a second bearer group (serving a third and fourth default bearer), and the decision to handover one or more of the bearers of the first bearer group may be based on the resource usage of the first and second bearer groups.

The above embodiments are based on a cellular network operating according to the LTE protocol. The skilled person will understand that the above procedures, in which bearers are established for each IMSI, are based on the techniques and terminology for that protocol. However, this is non-essential and the present invention may be realized in other protocols and by their corresponding processes for establishing and monitoring connections between UEs and the cellular networks. Thus, any radio access or cellular core networking components (regardless of protocol) capable of establishing a plurality of connections with one or more cellular networks on a single UE, wherein each connection is associated with a distinct subscription to a cellular network (thus having distinct resources), may realize the benefits of embodiments of the present disclosure by monitoring these plurality of connections and triggering a handover based on their resource usage.

The skilled person will also understand that in the particular method of establishing bearers in the LTE protocol detailed above, it is non-essential that the default bearers for each IMSI are established sequentially (that is, they may be established in parallel).

In the above embodiments, the base station directly monitors the plurality of connections of the multi-subscriber-UE and, if they satisfy a threshold, instructs a handover to another base station. However, the skilled person will understand that these activities may be performed in a separate network node, which may directly monitor the resource usage of one or more of the connections, compare it to a threshold, and initiate a handover.

Figure 7:
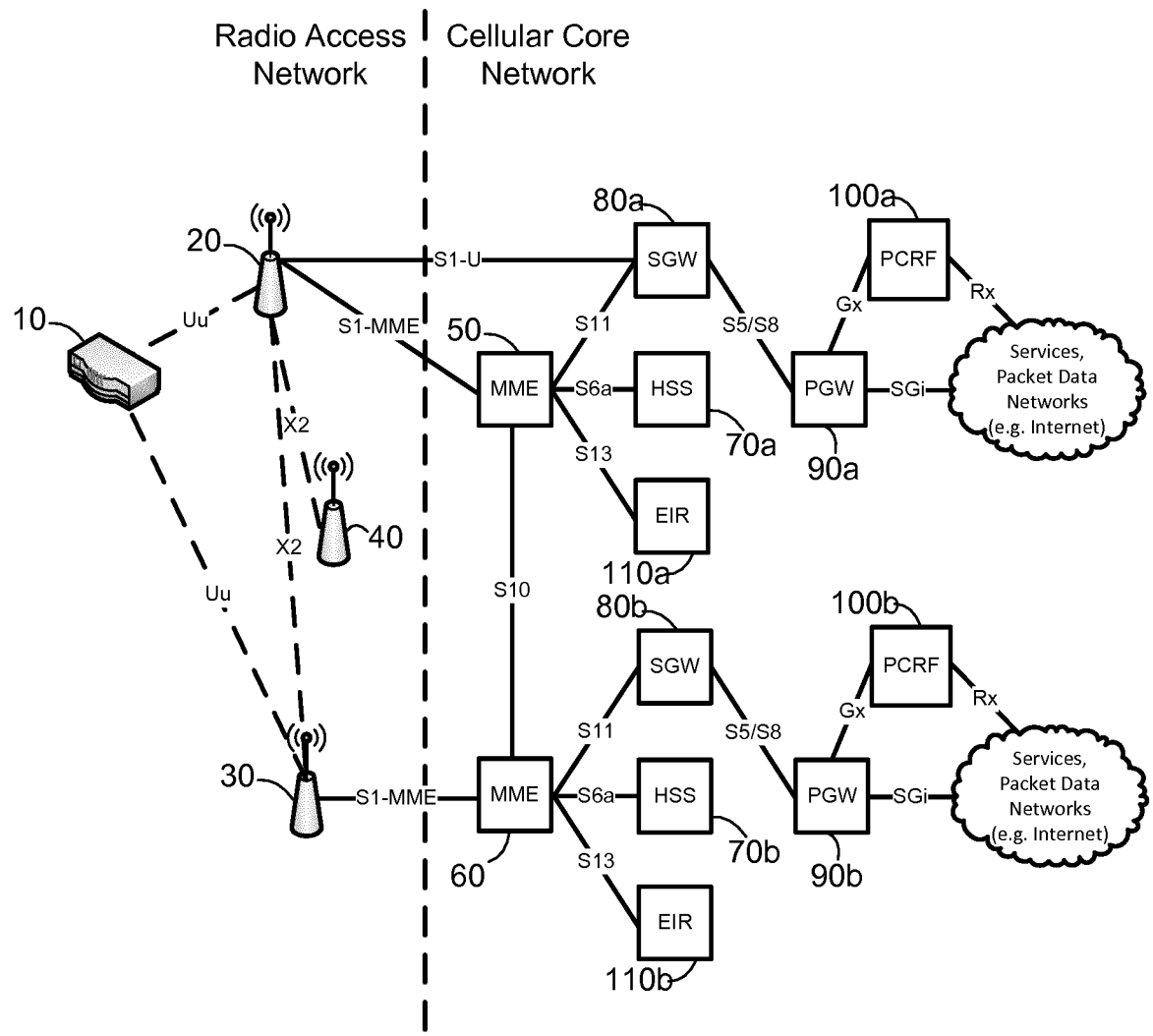
FIG. 7 is a schematic diagram of a cellular telecommunications network of a second embodiment of the present
Figure 8:
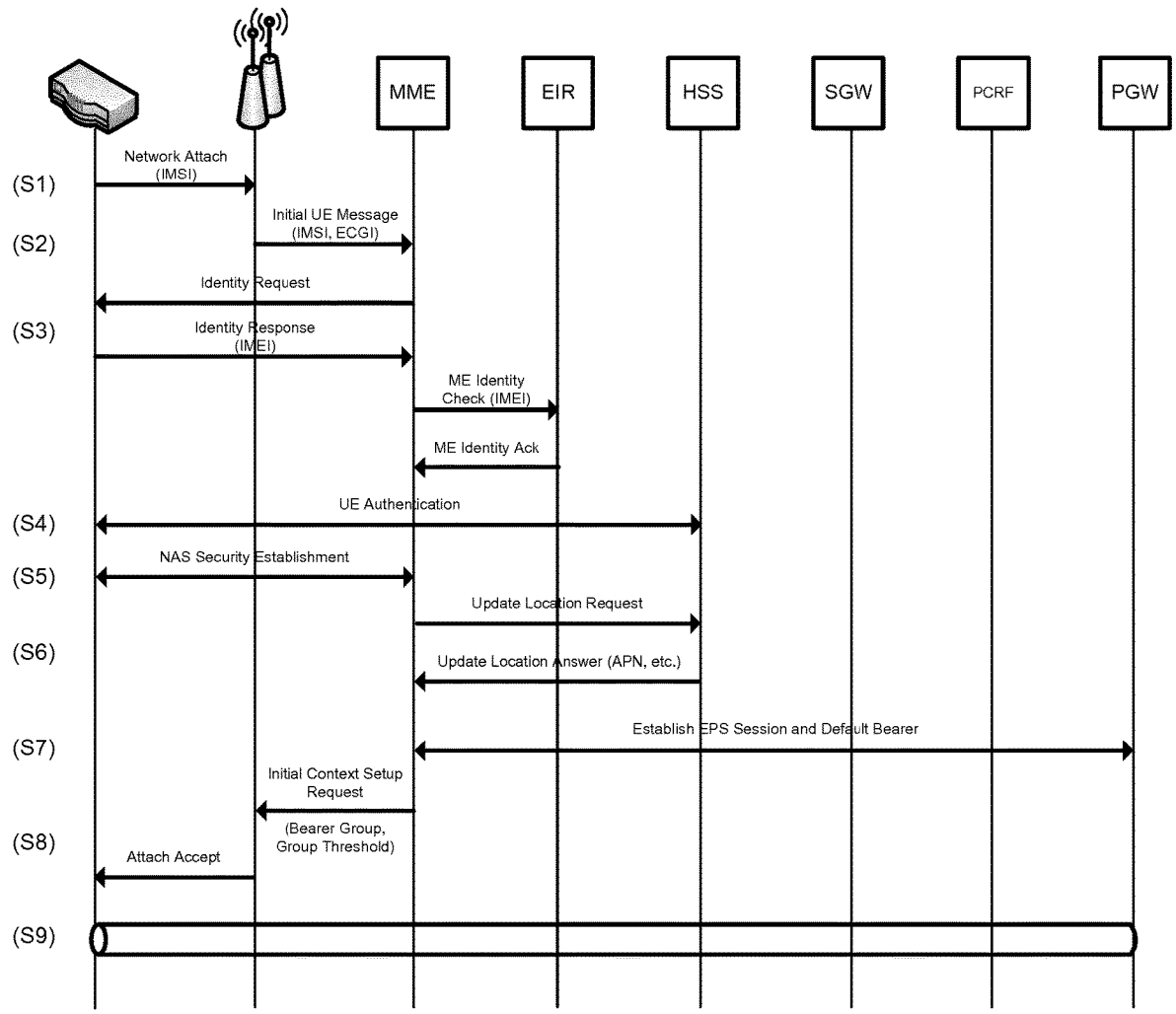
FIG. 8 is a call flow diagram illustrating a second embodiment of a method of the present disclosure.

A second embodiment of a method of the present disclosure will now be described, with reference to FIGS. 7 to 9. Several nodes and activities of the second embodiment are similar to those in the first embodiment, in which case the same reference numerals have been used. Any distinctions between the two embodiments are identified in the following description. For example, as shown in FIG. 7, the first base station 20 and first MME 50 are part of a first Network Operator's network, and the second base station 30 and second MME 60 are part of a second Network Operator's network, and each have their own set of core networking nodes. The appropriate interfaces are also illustrated in FIG. 7.

As in the first embodiment, the multi-subscriber-UE 10 performs a Network Attach procedure for the first IMSI (for the first SIM card and its associated first subscription for a cellular networking service), followed by a Network Attach procedure for the second IMSI (for the second SIM card and its associated subscription for a cellular networking service). As shown in FIG. 8, in S1, the multi-subscriber-UE 10 performs a cell selection process and selects the first base station 20. The multi-subscriber-UE 10 sends an 'Attach Request' message to the first base station 20, which includes the IMSI of the first SIM card. In S2, the first base station 20 sends an 'Initial UE Message' to the first MME 50, which has the 'Attach Request' message (and thus the IMSI of the first SIM card) embedded within, and further includes the first base station's E-UTRAN Cell Global Identifier (ECGI).

As will be known to those skilled in the art, the first IMSI of the first SIM card includes its Public Land Mobile Network (PLMN). This is an identifier for the Network Operator providing the first subscription for the cellular networking service for the first SIM card (in other words, an identifier for that SIM card's "home" network). Furthermore, the ECGI of the first base station 20 includes its PLMN. This is an identifier for the Network Operator which operates that base station. In this embodiment, the PLMN of the first IMSI of the first SIM card of the multi-subscriber-UE 10 is the same as the PLMN of the ECGI of the first base station 20, such that the Network Attach procedure for the first IMSI of the first SIM card is to a base station of its home network.

The remaining activities (S3 to S9) of the first embodiment are also implemented in this embodiment, such that a default bearer is established between the multi-subscriber-UE 10 and the PGW 90a for the first IMSI, and the first MME's first database and the first base station's first and second databases are populated with information concerning the bearer, the first IMSI, the IMEI, the APN, and the bearer group. However, in this embodiment, the first MME's first database is further populated to indicate the network associated with the first IMSI and the network associated with the serving base station, as shown in the following example:

TABLE 11

Table illustrating the first MME 50 first database with PLMN data following the Network Attach procedure for the first IMSI

| Serving BS | Serving BS Network | EPS Bearer ID | Associated IMSI | Home Network | Associated IMEI | PDN |
|---|---|---|---|---|---|---|
| 1ˢᵗ BS | PLMN 1 | 5 | IMSI 1 | PLMN 1 | IMEI 1 | APN 1 |

As noted above, the multi-subscriber-UE 10 also performs a Network Attach procedure for the second IMSI (for the second SIM card and its associated second subscription for a cellular networking service) using the same modified S1 and S2. However, in this example, the multi-subscriber-UE 10 selects the second base station 30 following its cell selection process for the second IMSI and therefore sends an 'Attach Request' message (including the second IMSI of the second SIM card) to the second base station 30. In S2, the second base station 30 sends an 'Initial UE Message' to the second MME 60, which includes the second IMSI of the second SIM card and its ECGI. In this embodiment, the PLMN of the second IMSI of the second SIM card of the multi-subscriber-UE 10 is different to the PLMN of the ECGI of the second base station 30, such that this Network Attach procedure for the second IMSI of the second SIM card is to a base station of a visited network.

Accordingly, the second MME's first database is populated with an entry relating to the second IMSI, thus:

TABLE 12

Table illustrating the second MME's 60 first database with PLMN data following the Network Attach procedure for the second IMSI

| Serving BS | Serving BS Network | EPS Bearer ID | Associated IMSI | Home Network | Associated IMEI | PDN |
|---|---|---|---|---|---|---|
| 2ⁿᵈ BS | PLMN 2 | 6 | IMSI 2 | PLMN 1 | IMEI 1 | APN 2 |

The second MME 60 detects that this Network Attach request relates to an IMSI and SIM card of a different network (as the network operator associated with the PLMN ID within IMSI 2 for the second IMSI is different to the network operator associated with the second base station 30 and second MME 60). In response, the second MME 60 sends the information in its first database concerning the second IMSI to the first MME 50 via the S10 interface. On receipt of the information via the S10 interface, the first MME 50 updates its first database, thus:

TABLE 13

Table illustrating the first MME 50 first database with PLMN data following the Network Attach procedure for the first IMSI and second IMSI

| Serving BS | Serving BS Network | EPS Bearer ID | Associated IMSI | Home Network | Associated IMEI | PDN |
|---|---|---|---|---|---|---|
| 1$^{st}$ BS | PLMN 1 | 5 | IMSI 1 | PLMN 1 | IMEI 1 | APN 1 |
| 2$^{nd}$ BS | PLMN 2 | 6 | IMSI 2 | PLMN 1 | IMEI 1 | APN 2 |

The remaining activities (S3 to S9) of the first embodiment are also implemented in this embodiment, such that a default bearer is established between the multi-subscriber-UE 10 and the PGW 90b for the second IMSI. As part of these steps, the first MME 50 determines that a bearer group exists in its first database (i.e. a group of bearer paths which relate to different IMSIs but the same IMEI). In this example, EPS Bearer IDs 5 and 6 are allocated to Bearer Group 1.

According to the above process, the first MME 50 of the second embodiment of the present disclosure populates a first database indicating that the multi-subscriber-UE 10 has a bearer group having a first and second default bearer associated with a first and second subscription respectively. Furthermore, the first MME's first database indicates that the first and second default bearers of this bearer group are connected via base stations of different networks (as the PLMNs of the serving base stations of the first and second default bearers of the bearer group are different) and that the second connection is via a base station of a visited network (as the PLMN of the second base station is not the same as the PLMN of the second IMSI).

Figure 9:
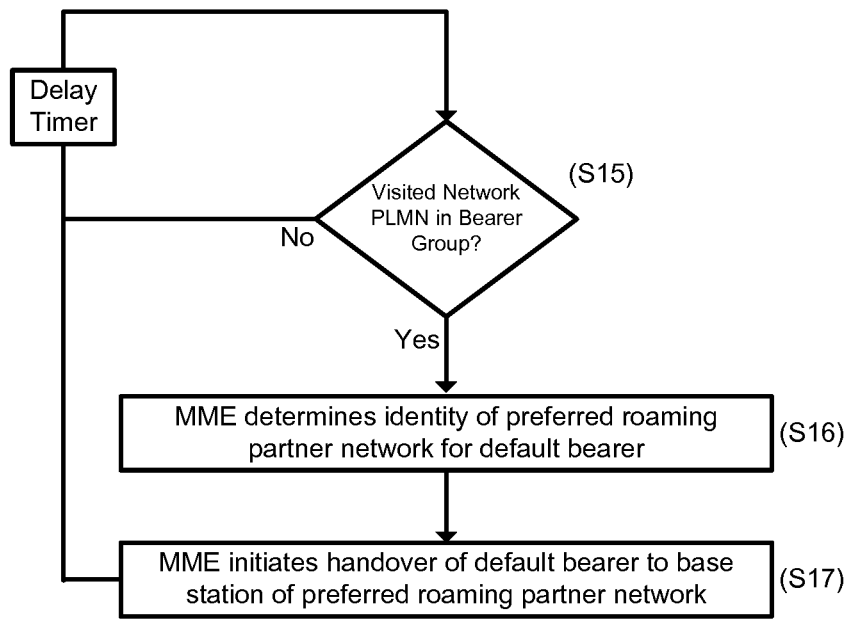
FIG. 9 is a flow diagram further illustrating the method of FIG. 8.

Following the above process, the first MME 50 is configured to perform the following iterative process (as outlined in FIG. 9). In S15, the first MME 50 determines, based on information stored in its first database, whether a bearer group has at least one default bearer associated with a visited network (i.e. one that is not its home network). In this example, EPS Bearer ID 6 of Bearer Group 1 is connected to a base station of the second network (PLMN 2, from the second base station's ECGI), whereas the home network for EPS Bearer ID 6 is the first network (PLMN 1, from IMSI 2). Accordingly, the process proceeds to S16 (if this determination was negative, then the process loops back to S15 to make the same determination based on any new information in the database).

In S16, the first MME 50 consults the second database to identify a preferred roaming partner for the first network. In this example, the second database indicates that a third network (PLMN 3) is a preferred roaming partner network for the first network. In S17, the first MME 50 sends an instruction to the multi-subscriber-UE 10 (via the second MME 60 and second base station 30) to initiate a transfer of the default bearer for the second IMSI of the second SIM card to a base station of the third network. The multi-subscriber-UE 10 therefore initiates a cell reselection process in which it only considers base stations of the third network (i.e. those having PLMN 3).

The second embodiment therefore provides a method by which an MME may initiate a transfer of one or more default bearers of a bearer group when those default bearers are not via a base station of their home network. These transfers are to a base station that is part of the default bearer's home network's preferred roaming partner, such that it is more likely that the default bearer will receive improved Quality of Service and more favorable billing rates. Furthermore, the first MME 50's second database may be updated more frequently than any equivalent PLMN list used by the multi-subscriber-UE as part of its cell (re-)selection process, such that the second embodiment of the present disclosure provides an improved method for encouraging default bearers to be established via base stations of preferred networks.

In the second embodiment, the multi-subscriber-UE 10 establishes default bearers for a first and second IMSI that are both associated with the first network (such that the PLMN ID of the first and second IMSIs are the same). However, the skilled person will understand that it is non-essential that the first and second default bearers for the multi-subscriber-UE are associated with the same home network. That is, the first IMSI for the first SIM card may be associated with the first network (such that the first subscription for a cellular networking service is from the first network) and the second IMSI for the second SIM card may be associated with the second network (such that the second subscription for a cellular networking service is from the second network). In this scenario, the home networks of the first and second default bearers would be PLMN 1 and PLMN 2 respectively, and if these bearers were established through the first and second base stations (as in the above example), then the determination in S15 would be negative as the PLMN for the serving base stations for each default bearer is the same as the PLMN for the home network. However, if the default bearer for the first IMSI was via the second or third base stations, or the default bearer for the second IMSI was via the first or third base stations, then the determination in S15 would be positive and the relevant MME would initiate a transfer of the default bearer having a serving base station which is not via its home network.

Furthermore, the skilled person will understand that there are synergies between the first and second embodiments. That is, if the first base station 10 of the first embodiment determines, at S11, that the combined resource usage is greater than a threshold, then, at S12, it may select a target base station based on the first MME's second database. That is, it may send a message to the first MME requesting the identity of a preferred roaming partner network for the home network of one or both of the default bearers for the bearer group. Once the first base station receives a response from the first MME, it may initiate a handover of one or more of the default bearers to a base station of the preferred roaming partner network (e.g. by instructing the UE to perform a cell reselection process in which only base stations having the PLMN of the preferred roaming partner network are considered).

In the second embodiment detailed above, the default bearer of the second connection is established between the multi-subscriber-UE 10 and APN 2. However, it is non-essential that the default bearers of the first and second connections be made to distinct APNs. That is, if appropriate breakout rules are applied, the connections may be home routed to the same APN.

The skilled person will also understand that it is non-essential in the second embodiment that only the connection being made by the visited network is subject to the transfer. That is, it may be more appropriate to transfer more than one, or all, of the connections for the multi-subscriber-UE 10 to base stations of the preferred roaming partner network.

The skilled person will understand that any combination of features may be possible within the scope of the disclosure, as claimed.

The invention claimed is:

1. A method of operating a network node in a cellular telecommunications network, wherein the cellular telecommunications network further includes a first base station and a first User Equipment (UE), and the first UE is connected to the first base station by a first connection and a second connection having resources associated with a first subscription and a second subscription, respectively, the method comprising:
   determining that the first connection and the second connection relate to the first subscription and the second subscription, respectively;
   determining that the first connection and the second connection relate to the first UE;
   defining a first connection group including the first connection and the second connection;
   monitoring a first resource usage of the first connection group;
   determining that the first resource usage of the first connection group exceeds a resource usage threshold from the first connection group; and
   in response to determining that the first resource usage of the first connection group exceeds the resource usage threshold from the first connection group, initiating a handover of one or both of the first connection and the second connection,
   wherein the first connection group further includes a third connection, the third connection relating to the first subscription and the first UE.

2. The method as claimed in claim 1, wherein the first resource usage is a cumulative resource usage of the first connection and the second connection with the first UE.

3. The method as claimed in claim 1, wherein initiating the handover is of both the first connection and the second connection to a second base station.

4. The method as claimed in claim 1, wherein initiating the handover is of one of the first connection or the second connection to a second base station.

5. The method as claimed in claim 1, wherein initiating the handover is of the first connection to a second base station and of the second connection to a third base station.

6. The method as claimed in claim 1, wherein the cellular telecommunications network further includes a second UE, and the second UE is connected to the network node by a third connection and a fourth connection having resources associated with a third subscription and a fourth subscription, respectively, the method further comprising:
   monitoring a second resource usage of one or both of the third connection and the fourth connection with the second UE; and
   initiating the handover of one or both of the first connection and the second connection based on one or both of the first resource usage and the second resource usage.

7. The method as claimed in claim 3, wherein the handover indicates to the second base station that the first connection and the second connection are associated with the first UE.

8. The method as claimed in claim 1, wherein the cellular telecommunications network further includes a management node having a database indicating a partnership between a first network and a second network, the method further comprising:
   detecting that one or both of the first connection and the second connection relates to the first network;
   sending a message to the management node, the message identifying the first network; and
   receiving a response message from the management node, the response message identifying the second network, wherein initiating the handover of one or both of the first connection and the second connection is to the second network.

9. The method as claimed in claim 1, wherein the network node is the first base station.

10. The method as claimed in claim 1, wherein defining a first connection group comprises assigning an identifier to the first connection group.

11. The method as claimed in claim 1, wherein the cellular telecommunications network further includes a management node having a first database indicating each bearer for the first base station and a second database indicating one or more associated preferred roaming partner networks.

12. A non-transitory computer-readable storage medium storing a computer program comprising instructions which, when the computer program is executed by a computer, cause the computer to carry out the method of claim 1.

13. A network node for a cellular telecommunications network, wherein the cellular telecommunications network further includes a first base station and first User Equipment (UE), wherein the first UE is connected to the first base station by a first connection and a second connection having resources associated with a first subscription and a second subscription, respectively, the network node comprising:
   a processor adapted to:
      determine that the first connection and the second connection relate to the first subscription and the second subscription, respectively;
      determine that the first connection and the second connection relate to the first UE
      define a first connection group including the first connection and the second connection;
      monitor a first resource usage of the first connection group;
      determine that the first resource usage of the first connection group exceeds a resource usage threshold from the first connection group; and
      in response to determining that the first resource usage of the first connection group exceeds the resource usage threshold from the first connection group, initiate a handover of one or both of the first connection and the second connection based on the first resource usage,
   wherein the first connection group further includes a third connection, the third connection relating to the first subscription and the first UE.

14. The network node as claimed in claim 13, wherein the processor is further adapted to assign an identifier to the first connection group.

* * * * *

UNITED STATES PATENT AND TRADEMARK OFFICE
CERTIFICATE OF CORRECTION

PATENT NO. : 11,516,710 B2
APPLICATION NO. : 16/487730
DATED : November 29, 2022
INVENTOR(S) : Cuevas Ramirez et al.

It is certified that error appears in the above-identified patent and that said Letters Patent is hereby corrected as shown below:

On the Title Page

Column 2, item (57), under Abstract, Line 1, delete "disclosure invention" and insert -- disclosure --, therefor.

In the Specification

In Column 5, Line 31, delete "MMES," and insert -- MMEs, --, therefor.

In Column 5, Line 58, delete "step S2," and insert -- S2, --, therefor.

In Column 7, Line 22, delete "first base station's 10" and insert -- first base station's 20 --, therefor.

In Column 8, Lines 60-61, delete "first base station's 10" and insert -- first base station's 20 --, therefor.

In Column 9, Lines 6-7, delete "first base station's 10" and insert -- first base station's 20 --, therefor.

In Column 9, Lines 18-19, delete "first base station 10" and insert -- first base station 20 --, therefor.

In Column 10, Line 3, delete "first base station 10" and insert -- first base station 20 --, therefor.

In Column 11, Line 12, delete "invention" and insert -- disclosure --, therefor.

In Column 14, Line 43, delete "first base station 10" and insert -- first base station 20 --, therefor.

In the Claims

In Column 16, Claim 13, Line 41, delete "first UE" and insert -- first UE; --, therefor.

Signed and Sealed this
Eleventh Day of April, 2023

*Katherine Kelly Vidal*

Katherine Kelly Vidal
*Director of the United States Patent and Trademark Office*